United States Patent
Bates et al.

(10) Patent No.: US 7,111,281 B2
(45) Date of Patent: Sep. 19, 2006

(54) METHOD, SYSTEM, AND ARTICLE OF MANUFACTURE FOR DEBUGGING UTILIZING SCREEN PATTERN RECOGNITION AND BREAKPOINTS

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 10/329,914

(22) Filed: Dec. 26, 2002

(65) Prior Publication Data

US 2004/0128655 A1      Jul. 1, 2004

(51) Int. Cl.
*G06F 9/44*      (2006.01)
*F06F 9/44*      (2006.01)

(52) U.S. Cl. .................................. 717/129; 717/124

(58) Field of Classification Search ................ 717/124, 717/129; 714/43
See application file for complete search history.

(56) References Cited

U.S. PATENT DOCUMENTS

| | | | |
|---|---|---|---|
| 5,664,159 A * | 9/1997 | Richter et al. ................. 703/23 |
| 6,077,312 A * | 6/2000 | Bates et al. ................. 717/129 |
| 6,295,613 B1 * | 9/2001 | Bates et al. ................... 714/43 |
| 6,550,056 B1 * | 4/2003 | Mizumoto et al. .......... 717/124 |
| 2001/0033657 A1 * | 10/2001 | Lipton et al. ............... 380/201 |

* cited by examiner

*Primary Examiner*—Tuan Dam
*Assistant Examiner*—Isaac Tecklu
(74) *Attorney, Agent, or Firm*—Patterson & Sheridan (57) ABSTRACT

An arrangement for improved debugging processes, systems, and articles of manufacture employing screen pattern recognition functionalities linked in the context of a debugger environment. In one embodiment, screen scraper functionalities are used in the context of a debugger environment.

20 Claims, 5 Drawing Sheets

METHOD, SYSTEM, AND ARTICLE OF MANUFACTURE FOR DEBUGGING UTILIZING SCREEN PATTERN RECOGNITION AND BREAKPOINTS

BACKGROUND OF THE INVENTION

The present invention relates generally to locating errors in computer programs and, more particularly, to debugging processes, systems and articles of manufacture employing screen pattern recognition functionalities linked in the context of a debugger environment.

Software bugs generally cause unexpected results during the execution of a computer program and are normally attributable to coding errors. Debugging is performed for locating, correcting or bypassing the located bugs in a computer program code. In this regard, debugging programs are routinely run by the programmer for determining the presence of such bugs; especially during creation of the program. A conventional operation performed by a debugger application is the establishment of breakpoint modes. In a breakpoint mode, operation of the software program is halted, whereby a programmer can step through successive lines of code usually commencing at the breakpoint for conducting analyses into the causes of bugs for purposes of correcting them.

A programmer who uses known debug technology to determine where a problem or bug is occurring, should have some knowledge of the program to know where the problem is occurring in order to know where to start the debugging process. However, that may not be the case and if programmers do not have this knowledge, they often find themselves stepping through the program at a fairly high level looking for a call that produces the undesired effect. Thereafter, the programmer reproduces the problem, but now can set a debug breakpoint before the call that produced the problem on the previous run. After hitting the new breakpoint, the programmer can step into the second call and then step through the routine, stepping over calls until the undesired effect occurs again. At this point, the process is repeated until the programmer can locate the source of the problem for effecting the desired changes. It will be appreciated that the foregoing process is highly repetitive and, therefore, relatively time consuming especially when considering complex programs. Moreover, in conventional debugging if execution of the program is halted for every hit of a breakpoint, the amount of time spent debugging increases for relatively large programs wherein the hit may occur thousands of times before the problem manifests itself.

Without the ability to relatively quickly debug programs, especially complex programs in a manner that quickly navigates to points of interest as well as obviates the excessive halting of the program at repetitive breakpoints unrelated to breakpoints of interest, the true potential of debugging is not entirely realized.

SUMMARY OF THE INVENTION

To overcome shortcomings of the prior art relating to debugging, the present invention provides enhanced method, system, and article of manufacture for debugging relatively quickly and easily.

A method of debugging a computer program comprising the steps of: selecting at least a screen pattern recognition rule to data corresponding to a screen pattern of interest; setting a debug breakpoint for hitting preselected features of a computer program related to the debug breakpoint and to the screen pattern of interest; and, firing a debug breakpoint to halt execution of the computer program if a match occurs between a breakpoint hit corresponding to the set debug breakpoint and a screen output determined to correspond to application of the selected rule to a screen.

In further accordance with the present invention, provision is made for a method of debugging a computer program comprising the steps of: selecting at least a screen scraper rule to data corresponding to a screen of interest; setting a debug breakpoint for hitting preselected features of a computer program related to the debug breakpoint and the screen of interest; and, firing a debug breakpoint to halt execution of the computer program if there is a match between a breakpoint hit corresponding to the set debug breakpoint and a screen scraper output that corresponds to application of the selected screen scraper rule to a screen.

In an illustrated embodiment, the method fires a breakpoint following a match between each change of screen scraper output that is the result of applying the screen scraper rule to the screen, and a breakpoint hit associated with the set debug breakpoint.

In another illustrated embodiment, the debug breakpoint that is established is tied to a particular computer program location in one mode of operation.

In another illustrated embodiment, the debug breakpoint that is established is not tied to a particular computer program location in another mode of operation.

An apparatus comprising: at least one processor; a memory coupled to the at least one processor; a computer program residing in the memory; a screen pattern recognition mechanism residing in the memory and executed by the at least one processor; the screen pattern recognition mechanism operable according to a screen pattern recognition command allowing selection of at least a screen pattern recognition rule to data corresponding to a screen pattern of interest; a debug mechanism residing in the memory and executed by the at least one processor; and, the debug mechanism operating according to a debug command that defines a debug breakpoint for hitting preselected features of the computer program that are related to the debug breakpoint and to the a screen pattern of interest, whereby the debug mechanism fires a breakpoint to halt execution of the computer program responsive to a match between a breakpoint hit corresponding to the debug breakpoint and a screen pattern recognition output determined to correspond to application of the selected screen pattern recognition rule to the screen.

In a still further preferred embodiment of the present invention provision is made for an apparatus comprising: at least one processor; a memory coupled to the at least one processor; a computer program residing in the memory; a screen scraper mechanism residing in the memory and executed by the at least one processor; the screen scraper mechanism operating according to a screen scraper command that defines at least a screen scraper rule to data corresponding to a screen of interest; a debug mechanism residing in the memory and executed by the at least one processor; and, the debug mechanism operating according to a debug command that allows setting of a debug breakpoint for hitting preselected features of a computer program related to the set debug breakpoint and the screen of interest; whereby the debug mechanism fires a breakpoint to halt execution of the computer program responsive to a match between a breakpoint hit corresponding to the set debug breakpoint and a screen scraper output corresponding to application of the selected screen scraper rule.

An aspect of the present invention is an improved debugging tool, method, and system.

A still further aspect of the present invention is for providing a debugging tool, method, and system to link the advantages of screen pattern recognition in a debugging environment.

A still further aspect of the present invention is for providing a debugging tool, method, and system to link the advantages of screen scraping in a debugging environment.

Another aspect of the present invention is for providing a debugging tool, method, and system for easily navigating to locations of interest.

Another aspect of the present invention is for providing a debugging tool, method, and system for easily navigating to locations of interest coinciding with the screen containing an error of interest.

A still further aspect of the invention is to provide for a debugging tool, method, and system for providing a user with the ability to obviate debugging features halting running of a computer program in response to repetitive stops not directly related to a particular screen or location of interest.

A still further aspect of the invention is to provide for a debugging tool, method, and system for providing a user with the ability to obviate debugging features halting computer program execution for repetitive breakpoint hits not directly related to a particular screen or location of interest.

A still further aspect of the present invention is to provide an invention as last noted for firing breakpoints only when matches exist between a breakpoint hit associated with a set debug breakpoint and a screen pattern output that results from applying rules to a screen.

A still further aspect of the present invention is to provide an invention as last noted for firing breakpoints only when matches exist between a breakpoint hit associated with a set debug breakpoint and a screen scraper screen output that results from applying screen scraping rules to a screen.

Another aspect of the present invention is an improved debugging tool that provides for multiple modes of operation.

DETAILED DESCRIPTION

Figure 1:
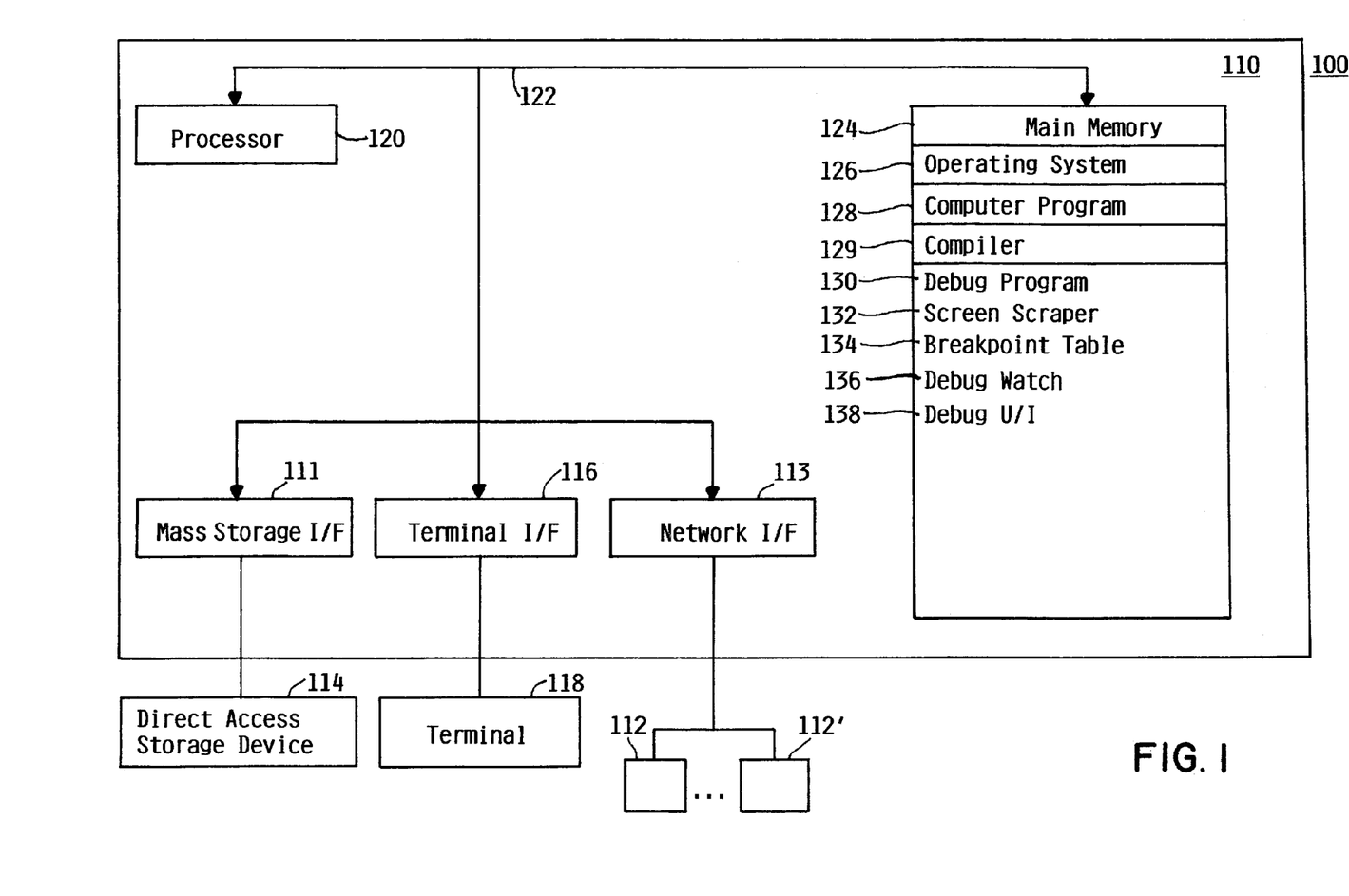
FIG. 1 is a high level diagram illustrating one embodiment of the present invention.

Reference is made to FIG. 1 for illustrating one preferred embodiment of a computer environment in a data processing system generally designated by reference numeral 100 for use in implementing the improved debugging process of the present invention.

As illustrated in FIG. 1, the computer environment 100 includes a computer system 110 including a plurality of networked devices 112. It will be understood that the computer system may be representative of one or more of the networked devices 112. The computer system and the networked devices could be any type of computer, computer system or other programmable electronic device, PC-based computers, workstations, network terminals, a client computer, a server computer, a portable computer, an embedded controller, etc. In this particular embodiment, the computer system is an eServer iSeries 400 computer system available commercially from International Business Machines Corporation, Armonk, N.Y.

The computer system 110 preferably includes a plurality of operators and peripheral systems as shown, for example, a mass storage interface 111 operably connected to a direct access storage device 114 by a video user interface 116 operably connected to a user interface terminal display 118 and by a network interface 113 operably connected to the plurality of networked devices 112. A user controls operation of the computer system by means of the user interface display 118 the latter of which may be any suitable display device known in the art that can be controlled by, for instance, a keyboard, mouse, pen-stylus, voice activated input, etc.

The computer system 110 is shown comprising at least one processor 120 that obtains instructions, or operations (opcodes), and data via a bus 122 from a main memory 124. The processor 120 could be any processor adapted to support the debugging processes of the present invention, apparatus and articles of manufacture of this invention. For example, the processor is a PowerPC commercially available from International Business Machines Corporation, Armonk, N.Y.

The main memory 124 is any memory sufficiently large to hold the necessary programs and data structures. The main memory could be any suitable memory or combination of memory devices, including Random Access Memory, non-volatile or backup memory. Furthermore, the memory may be considered to include memory located elsewhere in a computer system, such as any storage capacity used as virtual memory or stored in a mass storage device or on another computer coupled to the computer system 110 via the bus 122.

The main memory 124 includes an operating system 126, a computer program 128 to be debugged, a compiler 129, a debugger mechanism or program 130. Included in the debugger program 130 are components such as a type of screen pattern recognition mechanism 132, such as a screen scraper mechanism 132, a Breakpoint Table 134, a known type of debug watch mechanism or program 136, and a debug user interface U/I 138. Although treated as integral parts of the debugger program 130, one or more of the foregoing components may exist separately in the computer system. In this embodiment, the debugger program can be the iSeries System Debugger; a commercially available program that would reside in the client system. It will be appreciated that the debugger and the computer program to be debugged when executing communicate through the operating system. The debugger and its GUI are, preferably, resident on a client system or a server system in a stand-alone environment. However, the present invention contemplates that the debugger can be used in a distributive environment as well. It will also be understood that the term debugging includes all technical equivalents operating in a similar manner to accomplish a similar purpose.

In regard to the debugging process, the user will invoke the debugging mechanism 130 and the screen recognition or screen scraping mechanism 132. The debugger mechanism 130 is operable for generating one or more screens for the user to set breakpoints and for carrying out debugging operations. Any of the useful information desired for debugging can be provided. One example is a screen wherein the source code corresponding to the object code can be displayed during execution. The windows can display continuously the values of monitored variables. Also, the user can toggle between different windows as well as effect control from a remote screen. As is known, when a breakpoint is set, appropriate opcodes are placed into the object code and their locations are saved in a Breakpoint Table. When replaced opcodes are encountered during debugging, traps are activated and they are verified within the Breakpoint Table. Once the breakpoints are verified then corresponding hooks are called to allow a user to take control of the program for conventional debugging purposes. The hooks that are called halt the program being executed. At this point the user is provided with various debugging options that are well known in the art. A variety of other debugging options can include setting of the debug breakpoints and establishing their locations. A user specifies breakpoints that are intended to be used. The debug breakpoints are related to data (i.e., instructions) that defines the particular screen of interest. Examples of such breakpoints include computer statements or reference input/outputs, or any other expressions.

Another aspect of the debugger application 130 of the present embodiment is provision of a screen pattern recognition feature such as a screen scraper that allows the user to select screens evidencing a bug. A screen scraper mechanism is commercially available and allows a computer to intercept data from a memory—often presented in a green screen—and present it in an easier to understand graphical user interface (GUI). Some screen scrapers present the information in HTML, so it can be accessed with a browser over a network. It is to be understood that the terms "screen recognition" or "screen scraping" include all technical equivalents operating in a similar manner to accomplish a similar purpose. The screen recognition can include yet being developed and equivalent screen recognition systems. The screen scraper is but one kind of screen pattern recognition mechanism that is operable to determine the screen layout or geometry by allowing viewing as to how the screen is mapped to the computer program 128. In this embodiment, the screen scraper is used to catch mistakes. For instance, the screen scraped by the screen scraper program may indicate whether data (i.e., instructions) is missing or simply relocated to a different screen portion. The screen scraper routine or program 132 is set up so that it can be used to set up or indicate what the screen is and when the screen is changed so that the change can be set, whereby it can be used for comparing purposes as will be described.

Essentially, in this embodiment, the user points the screen scraper to a particular window, in a conventional fashion, by the application of at least one known screen scraper rule to data (i.e., instructions) that define a screen of interest. In particular, the user specifies the kind of window in which a bug or an error appeared. The screen scraper program is operable for applying the known rules for recognizing the desired screen layout and geometry that is selected by the user. The rules are applied in accordance with commands entered by a user. The screen scraper is operable for waking up for a screen change and these rules are applied for when change occurs.

In another embodiment, the user can invoke the debug watch mechanism 136 to be enabled during the debugging process if the latter is to be operated in another mode as described hereinafter. The breakpoints associated with the debug watch mode are set in any one of a variety known approaches according to known rules not forming part of the present invention. These specified debug breakpoints or watch signatures set epodes in the object code, preferably, corresponding to the user specified breakpoints or watch signatures. For instance, the breakpoints can be set to points of interest, locations, etc.

In the illustrated embodiments, the program(s) of the program product defines functions of the embodiments (including the methods described below) and can be contained on a variety of signal-bearing media. Illustrative signal-bearing media include, but are not limited to: (I) information permanently stored on non-writ able storage media (e.g., read-only memory devices within a computer such as CD-ROM disks readable by a CD-ROM drive); (ii) alterable information stored on writ able storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
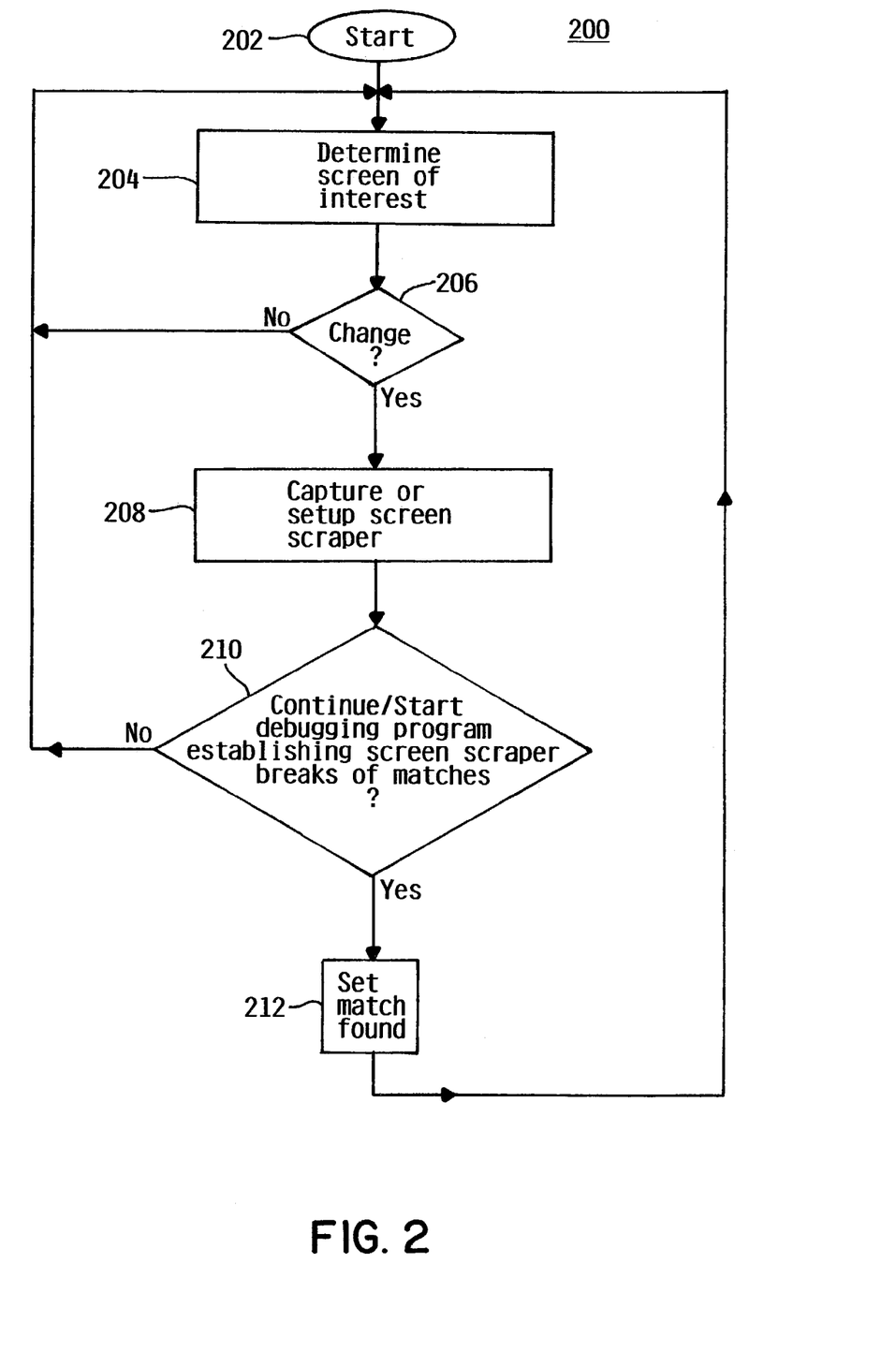
FIG. 2 is a flow diagram illustrating a screen scraping process according to the present invention.
Figure 3:
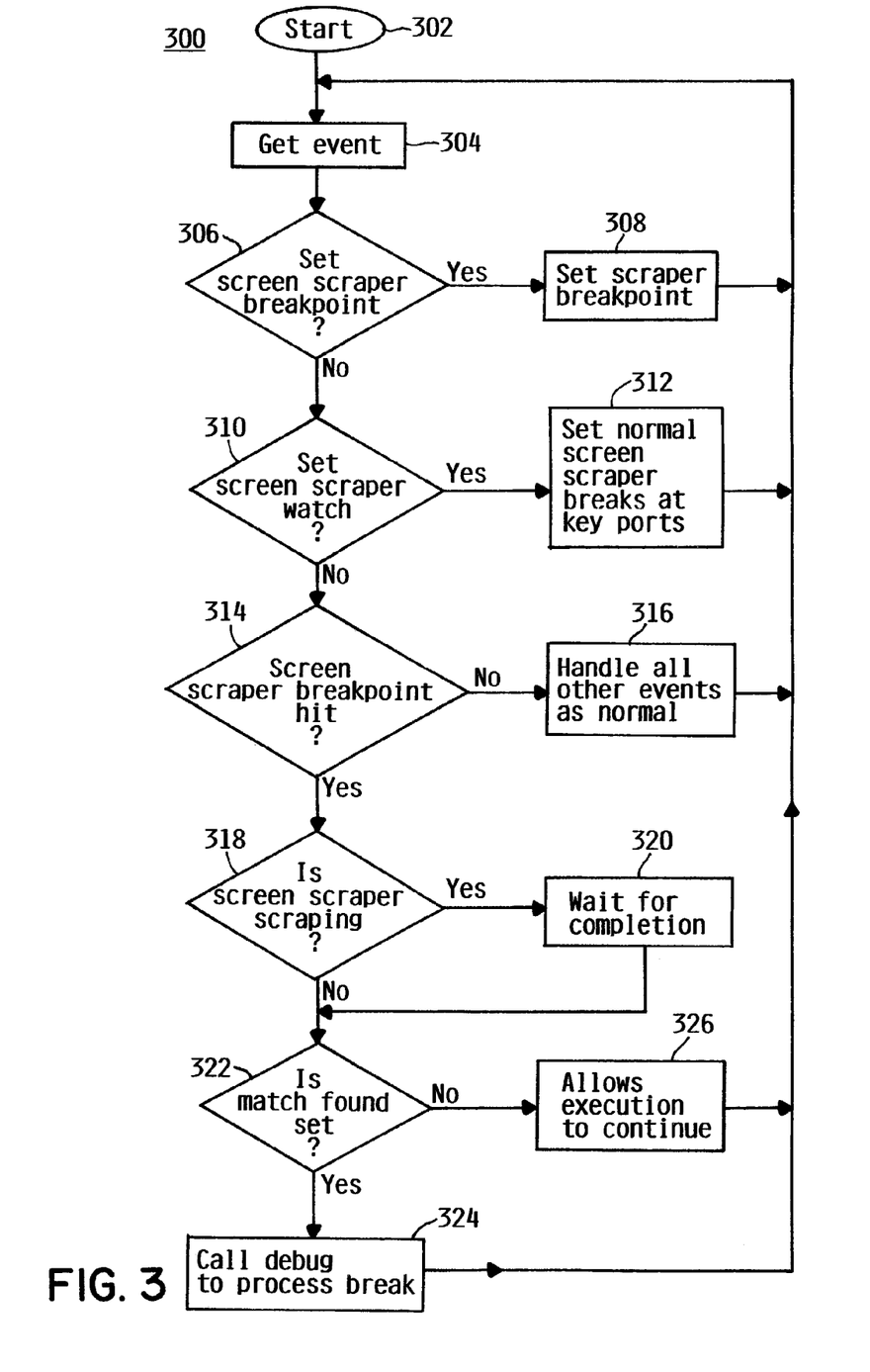
FIG. 3 is a flow diagram illustrating one embodiment of a debugging process according to the present invention.
Figure 4:
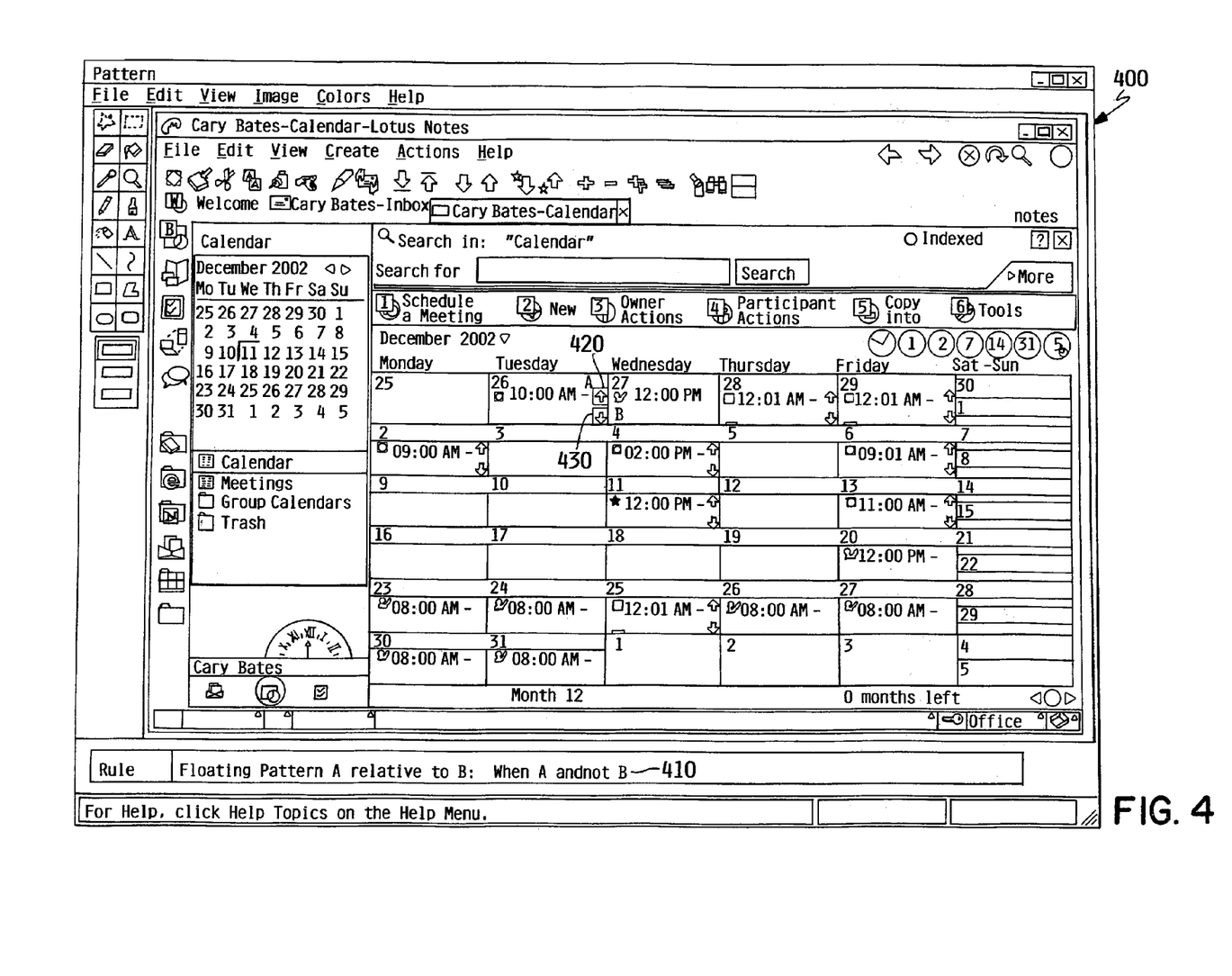
FIG. 4 is representative a screen pattern of interest to search along with an example of a screen scraper rule.
Figure 5:
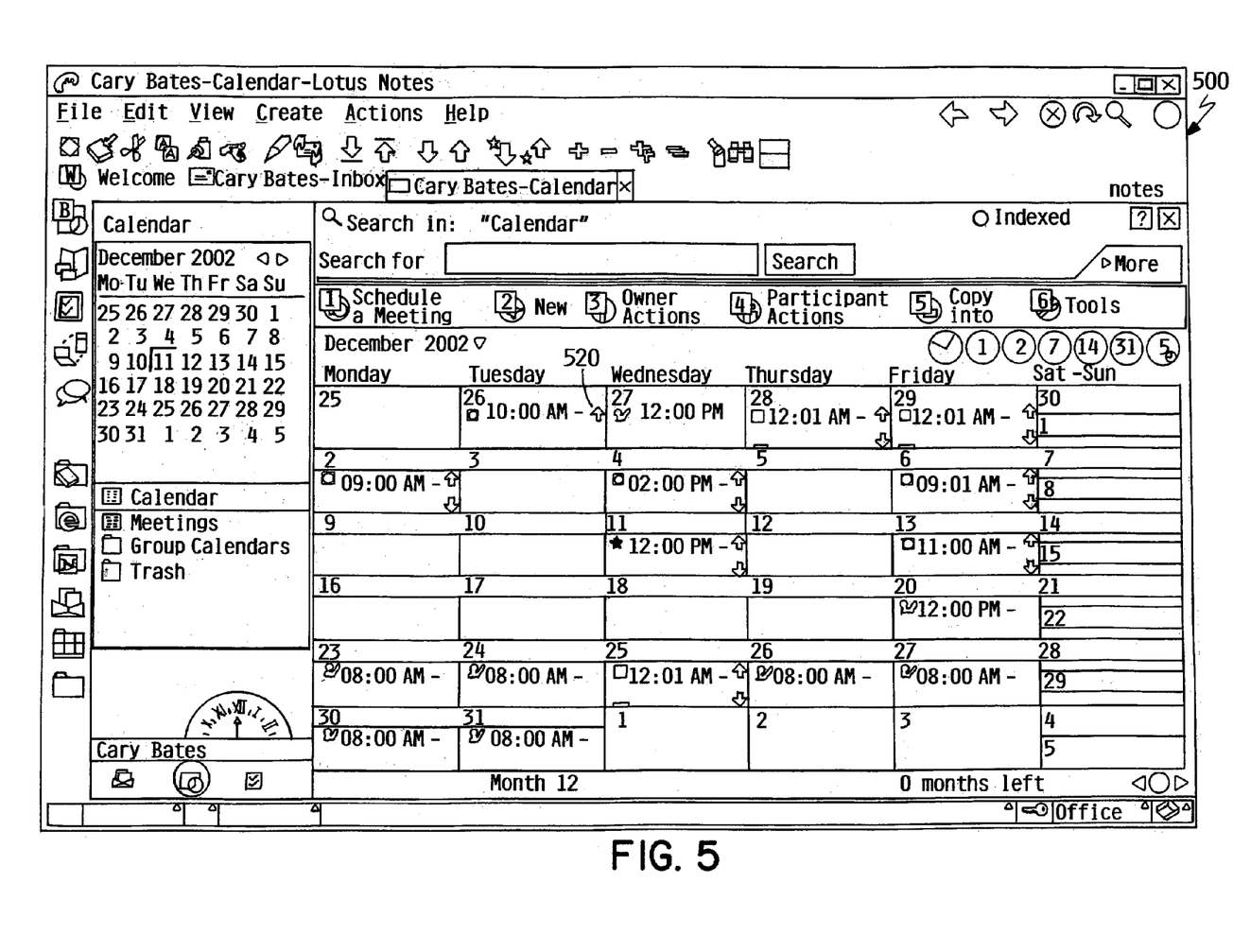
FIG. 5 is representative of a screen illustrating a match of the screen according to the screen scraper rule.

Reference is made to FIGS. 2, 4 and 5 for illustrating an overview of the screen scraping steps or process 200 undertaken in coordination with a debug process 300 (FIG. 3) of the debugging program 130 as will be described. The interface screen 400 is an example of a screen in which an error appears. The interface screen 400 has a field 410 in which a programmer can apply one or more of a wide variety of screen scraper rules. The present invention clearly envisions many directives and operators can make up these rules and for each there are a plurality of options. These options can be set when performing the matching of the screens to the screen scraper rules. For instance, the matching can include but not be limited to taking into account a number of factors, such as, color when matching, adjustments to the relative positions, how long the pattern must remain on the screen for there to be a match and others. The particular rule, for this embodiment is a floating pattern A relative to B to identify those screen patterns of interest "When A and not B". Stated somewhat differently, the rule states that there is a region or area "A" that bounds a screen pattern(s) 420 (e.g., arrow icon) that can occur anywhere on a screen. The other region "B" contains a screen pattern 430 (e.g., arrow icon). In this case, the region "B" must be found relative to wherever "A" is found. In this embodiment, the region "B" must be directly below region "A" by the same distance as when the regions "A" and "B" were established. The enclosed regions are set by a programmer by using for examples "squares" encompassing those areas of a screen containing a certain pattern of interest. It will be appreciated that if there is no occurrence of the regions "A" and "B" according to the rule in a screen, then there is no match. As shown in screen 500 of FIG. 5, if there is such an occurrence of the screen pattern 520 of region "A" and the screen pattern of region "B" is missing then there is a match according to the screen scraper rule. The screen scraping process 200 starts at the step 202. The screen scraper program is intended to be run, preferably in conjunction, with the debugging process 300 so as to operate in the manner described below. At step 204, a user through the debug user interface, can configure this program as by entering location or windows corresponding to, for example, an "error" screen indicative of a software bug to be located and corrected. The user inputs any of the known screen scraping rules, which do not, per se, form an aspect of the present invention. The screen scraping is performed in accordance with these known screen scraping rules for capturing or setting up the screen scraper screens as they change. The setting up process includes cutting and pasting the error screen of interest or a suitable portion thereof into a suitable screen scraping dialog box (not shown) at the user interface. The screen scraping rules relate to data (i.e., instructions) that define a screen of interest.

At step 206, the screen scraper will wait for a decision if the screen changed. As noted earlier, each screen is representative of a screen layout or geometric relationship of the data of the computer program 128. If there is a screen change, the screen will scrape at step 208 the data in accordance with the selected screen scraper rules. The scraper rules control attributes of the screen pattern of interest that is to be generated by the screen scraper. At step 210, the output of the scraped screen will be compared to data, using the screen scraper rules of the debugger as described hereinafter. If no match occurs, as will be explained hereinafter, then the screen is cleared and the process continues. If Yes there is a match, then such event is set at step 212, whereupon it waits being acted upon by the debugging process; as will be described. Following the match indication at step 212, the screen scraping process continues.

Referring to FIG. 3, there are illustrated exemplary steps of one preferred debugging process 300 according to the present invention. The debugging process 300 starts at step 302 wherein the computer program 128 is held in memory. In one embodiment at the Get Event step 304, the user provides appropriate input commands that relate to the debugging and screen scraping mechanisms. When using the debug mechanism 130, the user sets or configures a known debugger screen scraper breakpoint feature that will act to halt running of the computer program 128 at encountered points corresponding to the user specified breakpoints which screen scraper breakpoints are related to the screen of interest The debugger feature, in this embodiment, is an active breakpoint and operates in accordance with known debugger breakpoint rules that include establishing locations of the breakpoints. Besides active breakpoints being used, conditional breakpoints can be employed. Other kinds of debugging options are envisioned.

Also, at the Get Event step 304, the user selects one of at least two debugging modes of operation including one of a first or active breakpoint mode and a second or watch mode as will be described hereinafter. Other modes are contemplated. While the user controls operation at step 304, this invention considers that such is not necessarily so and that the breakpoints can be set automatically as is known.

At step 306, the input of the Get Event step 304 is tested to determine whether the user desires to set the breakpoint. If at step 306, it is determined that the user wants to set the breakpoints, then step 308 follows.

At step 308, the user is prompted at the user interface to complete the debug and screen scraping setting processes. This can be done by appropriate commands at the user interface.

When the breakpoint is set, the opcode is placed in the object code and its location is saved to a Breakpoint Table (not shown). When the replaced opcode is encountered a trap occurs and if it is verified within the Breakpoint Table, then a call allows the debugger to take control of the program. As noted, the hook calls notify the user that he can control the program being debugged. The hook calls allow the user to take control of the debugger for debugging the computer program. As also noted, the calls halt the computer program from being executed.

If a first debugging mode of operation is selected, the computer program 129 along with the active debugger breakpoint mechanism 130 and the screen scraper mechanism 132 are operated as follows. In the first mode, step 314 follows step 306, whereat a determination is made as to whether a debugger screen scraper breakpoint has been encountered or hit. If No, then step 316 follows, wherein the debugging process continues to operate and treats all other debugging events as normal. If Yes, then the process proceeds to step 318 whereat the screen scraper is queried as to whether or not the screen scraping is scraping. If Yes, then step 320 follows whereat the screen scraping is allowed to complete its operation for providing a screen output that is a result of the application of the screen scraper rules, whereupon step 322 follows. Step 322 also follows if at step 320 the decision at this block is negative.

At step 322, a determination is made as to whether or not a match occurs between the outputs of the screen scraper the breakpoint hit by the debugger process at step 314. If Yes, then step 324 follows whereby the computer program being debugged is halted and the user is notified by an indication of such match at the user interface. Accordingly, the user takes control over the debugger process and effects known debugging operations not, per se, a part of the present invention. If the decision at block or step 322 is No, then step 326 follows, whereby the process allows continued execution of the computer program and debugger process.

In a second mode of operation, it will be appreciated that at the decision block at step 310, a determination is made as to whether the user wants to set the debug watch mechanism. If Yes, then step 312 follows in which the user is prompted at the user interface display to configure the breakpoints desired. As noted earlier, the debug watch mechanism 136 has been configured by the user for choosing anyone of several watch events. For instance, in this embodiment the selected events include preselected statements, such procedure calls, or procedure entries, and, procedure expirations. From step 312 the process loops back for allowing continued running of the debugging process.

Once step 310 determines that the user wants the debug watch mechanisms and they have been properly configured, the process continues to step 314. At the decision block at step 314, a determination is made as to whether a screen scraper breakpoint that is related to the set debug breakpoint is hit. The breakpoint if hit will be displayed on the screen. If No breakpoint is hit, then step 314 follows for allowing handling of all other events associated with the debugging process. If a positive or Yes decision occurs at step 316 that a breakpoint is hit then step 318 follows. At step 318, an inquiry is made if the screen scraper is scraping. If Yes, then step 320 follows waiting for the scraping operation to complete, whereupon step 322 follows. Step 322 also follows without waiting if the decision of the decision block at step 318 is negative (i.e., screen scraping complete). At step 322, the debugging process in the second mode occurs for performing a similar match determination between an output of the screen scraper and the noted set debug breakpoint associated with the debug watch mechanism. If there is a match the breakpoint is fired and the debugging process takes control over the process at step 324. As previously noted, the breakpoint firing halts operation of the computer program so that it can process using known debugging procedures. If no match occurs there will not be a firing of the breakpoint, thereby allowing the execution of the debugging process to continue. It will be understood that the debugging process can be run at anytime and need not start at the beginning of the computer program.

It will be appreciated that the present invention provides for such advantages wherein a debugging method and apparatus easily navigate to locations of interest. Another advantage is that the invention can easily navigate to locations of interest coinciding with screens containing errors of interest. Still further advantages derived are that the debugging method and apparatus obviate debugging breakpoints halting running of a program being debugged in response to repetitive breakpoint hits not directly related to particular screens or locations of interest.

The embodiments and examples set forth herein were presented to best explain the present invention and its practical applications and to thereby enable those skilled in the art to make and use the invention. However, those skilled in the art will recognize that the foregoing description and examples have been presented for the purposes of illustration and example only. The description set forth is not intended to be exhaustive or to limit the invention to the precise forms disclosed. In describing the above preferred embodiments illustrated in the drawings, specific terminology will be used for the sake of clarity. However, the invention is not intended to be limited to the specific terms selected. It is to be understood that each specific term includes all technical equivalents, which operate in a similar manner to accomplish a similar purpose. Many modifications and variations are possible in light of the above teachings without departing from the spirit and scope of the appended claims.

The invention claimed is:

1. A method of debugging a computer program comprising the steps of:
    selecting at least a screen pattern recognition rule to data corresponding to a screen pattern of interest;
    setting a debug breakpoint for hitting preselected features of a computer program related to the debug breakpoint and to the screen pattern of interest; and,
    firing a debug breakpoint to halt execution of the computer program if a match occurs between a breakpoint hit corresponding to the set debug breakpoint and a screen output determined to correspond to application of the selected rule to a screen.

2. The method according to claim 1 wherein selecting the screen pattern of interest is through application of a screen scraper using at least a screen scraper rule.

3. The method according to claim 1 wherein the match that triggers firing occurs between the breakpoint that is hit and at least every screen output that corresponds to the selected rule.

4. A method of debugging a computer program comprising the steps of:
    selecting at least a screen scraper rule to data corresponding to a screen of interest;
    setting a debug breakpoint for hitting preselected features of a computer program related to the debug breakpoint and to the screen of interest; and,
    firing a debug breakpoint to halt execution of the computer program if a match occurs between a breakpoint hit corresponding to the set debug breakpoint and a screen scraper output corresponding to application of the selected screen scraper rule to a screen.

5. The method according to claim 4 wherein the match that triggers firing occurs between the breakpoint that is hit and at least every screen output that corresponds to the selected screen scraper rule.

6. The method according to claim 5 further comprising the step of: establishing the debug breakpoint tied to a particular computer program location in one mode of operation.

7. The method according to claim 5 further comprising the step of: establishing the debug breakpoint that is not tied to a particular computer program location in another mode of operation.

8. The method according to claim 5 further wherein the matching step comprises inquiring if the screen that is scraped has changed.

9. The method according to claim 4 further wherein a user is notified of the occurrence of a match.

10. An apparatus comprising:
    at least one processor;
    a memory coupled to the at least one processor; a computer program residing in the memory;
    a screen pattern recognition mechanism residing in the memory and executed by the at least one processor;
    the screen pattern recognition mechanism operable according to a screen pattern recognition command allowing selection of at least a screen pattern recognition rule to data corresponding to a screen pattern of interest;
    a debug mechanism residing in the memory and executed by the at least one processor; and,
    the debug mechanism operating according to a debug command that defines a debug breakpoint for hitting preselected features of the computer program that are related to the debug breakpoint and to the a screen pattern of interest, whereby the debug mechanism fires a breakpoint to halt execution of the computer program responsive to a match between a breakpoint hit corresponding to the debug breakpoint and a screen pattern recognition output determined to correspond to application of the selected screen pattern recognition rule to the screen.

11. The apparatus according to claim 10 wherein the screen pattern recognition mechanism comprises a screen scraper mechanism operable by application of at least a screen scraper rule.

12. The apparatus according to claim 10 wherein the debug mechanism fires a breakpoint to halt execution of the computer program if a screen pattern recognized by the screen pattern recognition mechanism changes and there is the match between the screen pattern output and the debug breakpoint hit.

13. The apparatus according to claim 10 wherein the match that triggers firing occurs between the breakpoint that is hit and each recognized screen pattern that corresponds to the selected rule.

14. The apparatus according to claim 10 wherein the debug mechanism provides for a debug watch in a second mode that defines the debug breakpoint hit corresponding to at least one allowable user specified event not tied to a program location.

15. An apparatus comprising:
at least one processor;
a memory coupled to the at least one processor;
a computer program residing in the memory; a screen scraper mechanism residing in the memory and executed by the at least one processor;
the screen scraper mechanism operable according to a screen scraper command allowing selection of at least a screen scraper rule to data corresponding to a screen of interest;
a debug mechanism residing in the memory and executed by the at least one processor; and,
the debug mechanism operating according to a debug command that defines a debug breakpoint for hitting preselected features of the computer program that are related to the debug breakpoint and to the a screen of interest, whereby the debug mechanism fires a breakpoint to halt execution of the computer program responsive to a match between a breakpoint hit corresponding to the debug breakpoint and a screen scraper output corresponding to application the selected screen scraper rule to the screen.

16. The apparatus of claim 15 wherein the debug mechanism fires a breakpoint to halt execution of the computer program if a screen scraped by the screen changes and there is the match between the screen scraper output and the debug breakpoint hit.

17. A computer readable storage medium containing a computer program product for debugging a computer program, the product comprising:
a screen pattern recognition mechanism that is executable on the computer program and operates according to a screen pattern command that selects at least a screen pattern recognition rule to data corresponding to a screen pattern of interest;
a debug mechanism that is executable on the computer program and operates according to a debug command that sets at least a debug breakpoint for hitting preselected features of a computer program related to the set debug breakpoint and the screen pattern of interest, whereby the debug mechanism fires a breakpoint to halt execution of the computer program responsive to a match between a screen pattern output resulting from application of the rule and the set debug breakpoint.

18. The program product of claim 17 wherein the debug mechanism fires the breakpoint in a first mode if the breakpoint is tied to a particular location of the computer program.

19. The program product of claim 12 wherein the debug mechanism fires the breakpoint in a second mode if the breakpoint is not tied to a particular location of the computer program.

20. A computer readable storage medium containing a computer program product for debugging a computer program, the product comprising:
a screen scraper mechanism that is executable on the computer program and operates according to a screen scraper command that selects a screen scraper rule to data corresponding to a screen of interest;
a debug mechanism that is executable on the computer program and operates according to a debug command that sets at least a debug breakpoint for hitting preselected features of a computer program related to the set debug breakpoint and the screen of interest, whereby the debug mechanism fires a breakpoint to halt execution of the computer program responsive to a match between a screen scraper output resulting from application of the rule and the set debug breakpoint.

* * * * *